(12) United States Patent
Hino et al.

(10) Patent No.: US 8,315,491 B2
(45) Date of Patent: Nov. 20, 2012

(54) OPTICAL CONNECTOR AND OPTICAL COUPLING STRUCTURE

(75) Inventors: Tomoyuki Hino, Tokyo (JP); Ichiro Hatakeyama, Tokyo (JP); Ichiro Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 548 days.

(21) Appl. No.: 12/438,212

(22) PCT Filed: Jul. 17, 2007

(86) PCT No.: PCT/JP2007/064106
§ 371 (c)(1),
(2), (4) Date: Mar. 11, 2009

(87) PCT Pub. No.: WO2008/023508
PCT Pub. Date: Feb. 28, 2008

(65) Prior Publication Data
US 2010/0232746 A1    Sep. 16, 2010

(30) Foreign Application Priority Data
Aug. 22, 2006    (JP) .................... 2006-225417

(51) Int. Cl.
G02B 6/26    (2006.01)
G02B 6/42    (2006.01)
(52) U.S. Cl. ................ 385/31; 385/53; 385/93
(58) Field of Classification Search .......... None
See application file for complete search history.

(56) References Cited

U.S. PATENT DOCUMENTS

2003/0159772 A1* 8/2003 Wolf et al. .................. 156/182
2004/0184737 A1* 9/2004 Oono et al. .................. 385/52

FOREIGN PATENT DOCUMENTS

| CN | 1701540 A | 11/2005 |
| JP | 1998186183 A | 7/1998 |
| JP | 2002076496 A | 3/2002 |
| JP | 2003207694 A | 7/2003 |
| JP | 2004031508 A | 1/2004 |
| JP | 2004295111 A | 10/2004 |
| JP | 2005099761 A | 4/2005 |
| JP | 2005172989 A | 6/2005 |
| JP | 2005292739 A | 10/2005 |
| WO | 2004097480 A | 11/2004 |

OTHER PUBLICATIONS

Chinese Office Action for CN20078001207.3 issued Mar. 9, 2010.
International Search Report for PCT/JP2007/064106 mailed Aug. 14, 2007.

* cited by examiner

*Primary Examiner* — Omar Rojas

(57) ABSTRACT

To provide an optical connector which enables heat generated by an optical interface module arranged on the lower surface of the optical connector to be efficiently dissipated from the upper surface of the optical connector. The optical connector includes an optical transmission path 101 including a 45-degree mirror 106 at an end section thereof, wherein, in the optical transmission path 101, the lower surface on which an optical input/output section 102 is provided, and the upper surface facing the lower surface are sandwiched by metal patterns 107 and 108 having a heat conductivity higher than that of the optical transmission path 101, and wherein the metal patterns 107 and 108 are physically connected to each other by heat dissipation vias 103 having a heat conductivity higher than that of the optical transmission path 101.

7 Claims, 9 Drawing Sheets

OPTICAL CONNECTOR AND OPTICAL COUPLING STRUCTURE

INCORPORATION BY REFERENCE

This application is the National Phase of PCT/JP2007/064106, filed Jul. 17, 2007, which claims priority to Japanese Patent Application No. 2006-225417, filed on Aug. 22, 2006.

TECHNICAL FIELD

The present invention relates to an optical connector which is inserted and extracted into and from a module for transmitting signals between information apparatuses, such as a router, a server, and a storage, or between boards, or in a backplane.

BACKGROUND ART

In recent years, as a result of the remarkable increase in the amount of information to be handled by information apparatuses, such as a router, a server, and a storage, it is clearly recognized that the electric transmission in the interconnection between the information apparatuses, or between boards, or in a backplane is reaching its limit, and hence the need for interconnection by optical transmission is increased.

For this reason, an interface module for optical interconnection is also developed.

As a light source of the optical module for optical interconnection, a VCSEL (Vertical Cavity Surface Emitting Laser) is used in many cases. As reasons for this, there are listed such characteristics as low power consumption, low cost, high coupling efficiency with optical fibers, and high two-dimensional integration and paralleling properties. Since the VCSEL has such properties, it is most suitable as the light source used for the optical interconnection module in the apparatus.

The emission direction of the VCSEL is vertical to a substrate. In other words, the VCSEL emits a light beam in the direction vertical to the substrate.

An optical interface module of this type is configured by a substrate on which an optical element, such as the VCSEL, and a driver IC, are mounted, a via substrate which transmits a signal from on the substrate to a mounting board, and a case to which a light extraction section, such as a lens, is attached.

As an example of a related-art optical module, there is disclosed in Patent Document 1 "a photoelectric composite module and an optical input/output apparatus using the module as a component".

FIG. 1 shows a sectional view of the optical module disclosed in Patent Document 1.

On a transparent plate 601 in which an interlayer wiring is formed, and on the upper and lower surfaces of which wiring patterns are formed, an optical element 602 for transmitting or receiving an optical signal is connected to wiring electrodes by flip chip mounting, and an input/output IC 603 for adjusting the current amplitude of the optical element (a driver IC in the case where the optical element is a light emitting element, or an electric amplifier IC in the case where the optical element is a light receiving element) is also similarly connected to wiring electrodes by flip chip mounting.

Further, on the transparent plate 601, the optical coupling between the optical element and an optical connector is realized via optical coupling means such as a lens. A signal line between the input/output IC and a board on which the optical module is mounted is connected to an electrode on the board from the transparent plate 601 via a via substrate (interlayer wiring board) 604. The heat generated by the driver IC is dissipated in the direction from under the optical module to the mounting board.

In the optical interface module of this type, it is necessary to restrict the optical transmission path within the height of a rack housing the board, and hence it is necessary to provide an optical-axis changing function in the optical connector which is optically coupled with the optical interface module.

As a related art of such optical connector, "an optical module" is disclosed in Patent Document 2.

FIG. 2 shows a configuration of the optical connector disclosed in Patent Document 2. The optical connector is configured such that V-grooves 701 for positioning fibers and a 45-degree inclined mirror 702 are provided in a connector portion, and that an optical fiber array 703 is mounted in the V-grooves 701 and is pressed by a cover glass 704. A light beam emitted from the optical fiber array 703 is once emitted in free space, and is then reflected by the 45-degree inclined mirror, so as to be emitted from the optical connector in the state where the optical path thereof is bent by 90 degrees. Then, the light beam is coupled with an optical interface module via optical coupling means such as a lens.

Patent Document 1: Japanese Patent Laid Open Publication No. 2004-31508

Patent Document 2: Japanese Patent Laid Open Publication No. 2003-207694

Patent Document 3: Japanese Patent Laid Open Publication No. 10-186183

DISCLOSURE OF THE INVENTION

Problems to be Solved by the Invention

However, when the optical module is optically coupled with the optical connector, it is difficult to secure a heat path. That is, since the optical connector is inserted and extracted immediately above a heat generating body such as the optical element and the driver IC in the optical interface module, it is difficult to dissipate the heat in the upward direction.

Further, in the case where the heat is dissipated in the downward direction of the module, since the transparent plate on which the optical element and the driver IC are mounted is not brought into direct contact with the mounting board, it is necessary to dissipate the heat to the side of the mounting board by reducing the downward heat resistance by providing a heat dissipation material between the driver IC and the mounting board.

In "an optical array module" disclosed in Patent Document 3, there is disclosed a structure for fixing an optical fiber in an optical module by using an optical fiber fixing block. In this structure, when the optical fiber fixing block is made of a metal, the heat of the substrate can be dissipated in the upward direction. However, the structure is configured to fix the optical fiber, and hence cannot be applied to the optical connector which allows the optical fiber to be inserted and extracted into and from the optical module.

As described above, in the structure of the optical interface module, there are problems that it is difficult to dissipate the heat in the upward direction of the module, and that in order to realize the heat dissipation in the downward direction, the structure of the module becomes complicated.

The present invention has been made in view of the above described problems. An object of the present invention is to provide an optical connector which enables the heat generated in the optical interface module arranged on the lower surface of the optical connector to be efficiently dissipated from the upper surface of the optical connector, and to provide an optical coupling structure using the optical connector.

Means for Solving the Problems

In order to achieve the above described object, according to the present invention, there is provided an optical connector which includes an optical transmission path including an optical path changing function section at an end section thereof, wherein, in the optical transmission path, a light incident/emitting surface and the surface facing the light incident/emitting surface are sandwiched by high heat conductive members having a heat conductivity higher than that of the optical transmission path, and wherein the high heat conductivity members on both the surfaces of the optical transmission path are physically connected to each other by a heat transfer member having a heat conductivity higher than that of the optical transmission path.

According to the present invention, it is preferred that the optical path changing function section reflects a light beam made vertically incident on one surface of the optical transmission path so as to guide the reflected light beam into the optical transmission path. Alternatively, it is preferred that the optical path changing function section reflects a light beam transmitted in the optical transmission path so as to emit the reflected light beam vertically from one surface of the optical transmission path.

In any of the above described configurations according to the present invention, it is preferred that the high heat conductive member is in a gel state or in a sheet state. Alternatively, it is preferred that the high heat conductive member is made of a metal.

In any of the above described configurations according to the present invention, it is preferred that the heat transfer member is formed by filling a material having a heat conductivity higher than that of the optical transmission path in a through hole formed in the optical transmission path. Alternatively, it is preferred that the heat transfer member is a heat dissipation via formed through the optical transmission path.

In any of the above described configurations according to the present invention, it is preferred that a protrusion or hole for fitting an optical interface module is formed on the light incident/emitting surface of the optical transmission path. Further, it is preferred that an alignment marker for fitting the optical interface module is formed on the optical transmission path.

Further, in order to achieve the above described object, the present invention is to provide an optical coupling structure in which the light incident/emitting surface of the optical connector having one of the above described configurations is arranged to face the light emitting/incident surface of the optical interface module.

Advantages of the Invention

According to the present invention, it is possible to provide an optical connector which enables heat generated by an optical interface module arranged on the lower surface of the connector to be efficiently dissipated from the upper surface of the connector, and to provide an optical coupling structure using the optical connector.

BEST MODE FOR CARRYING OUT THE INVENTION

[First Exemplary Embodiment]

There will be described a first exemplary embodiment in which the present invention is preferably implemented.

Figure 1:
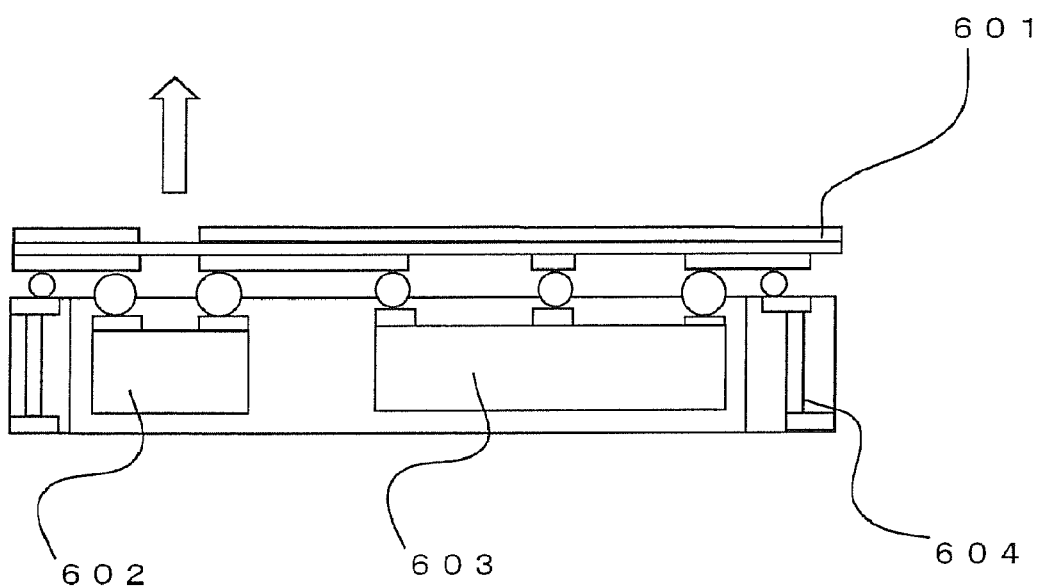
FIG. 1 is a figure showing a configuration of a conventional optical connector.
Figure 2:
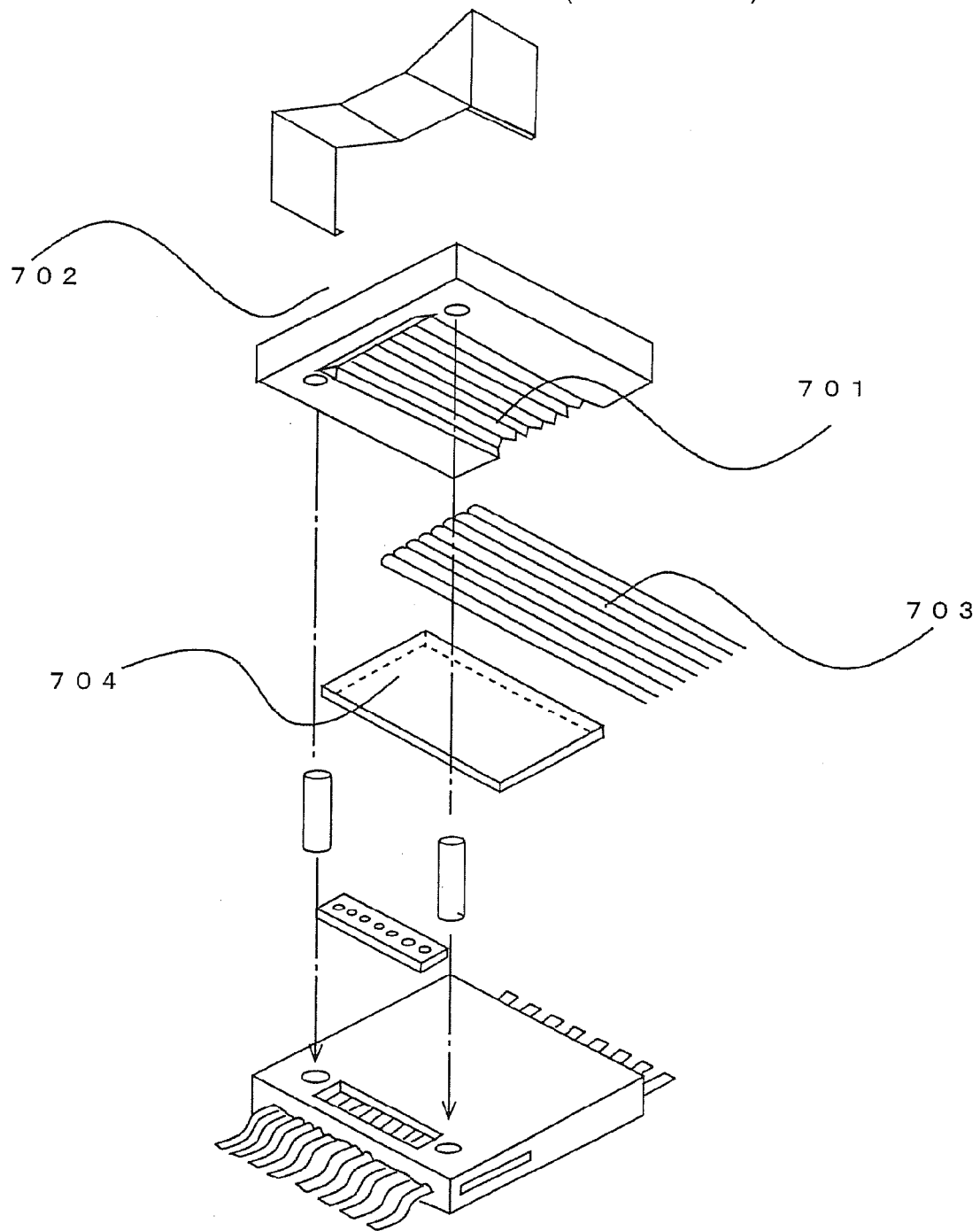
FIG. 2 is a figure showing a configuration of a conventional optical connector.
Figure 3:
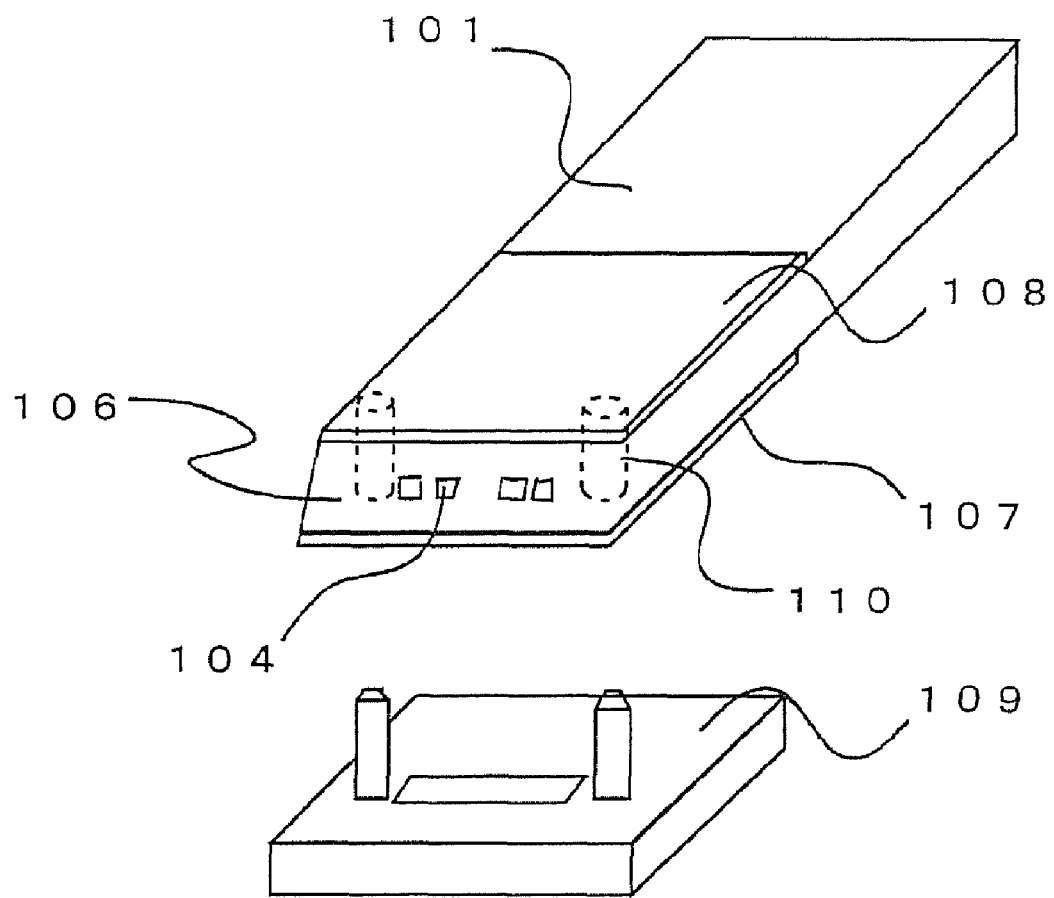
FIG. 3 is a figure showing a configuration of an array optical connector according to a first exemplary embodiment in which the present invention is preferably implemented.
Figure 4:
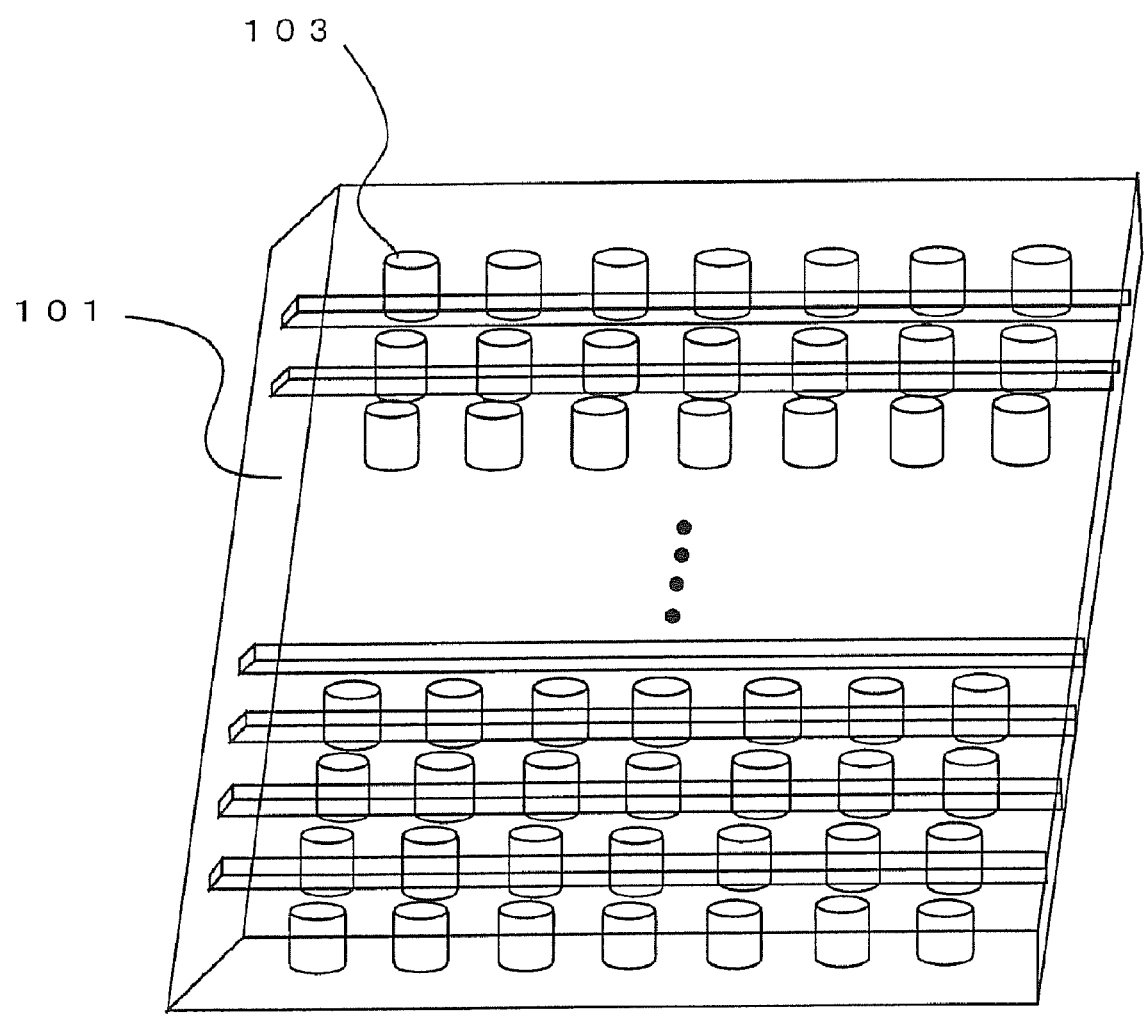
FIG. 4 is a figure showing a configuration of the array optical connector according to the first exemplary embodiment.
Figure 5:
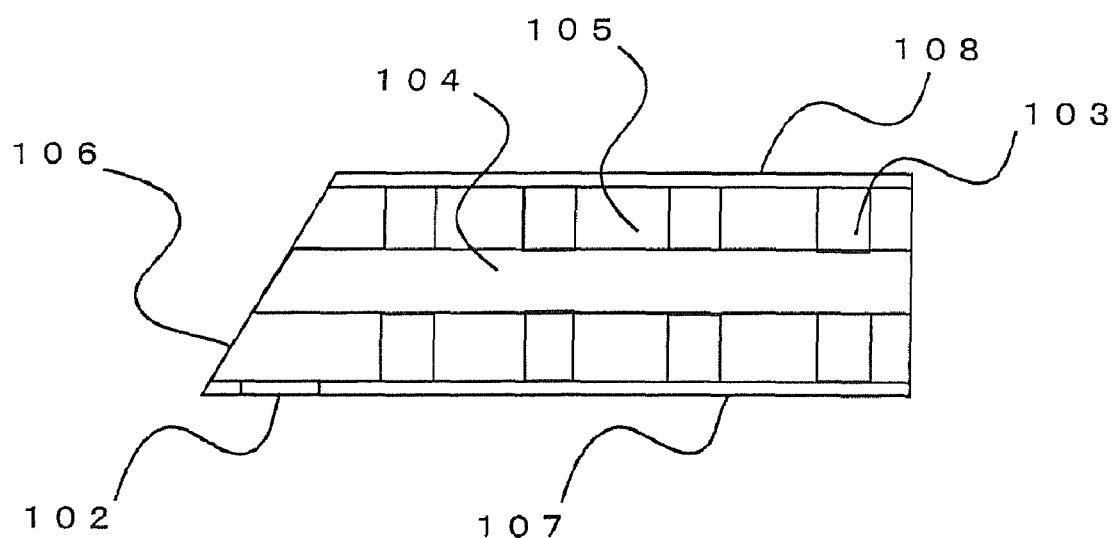
FIG. 5 is a figure showing a configuration of the array optical connector according to the first exemplary embodiment.

FIG. 3, FIG. 4 and FIG. 5 show a configuration of an array optical connector according to the present embodiment. FIG. 3 and FIG. 4 are perspective views of the array optical connector according to the present embodiment. FIG. 5 is a sectional view of the array optical connector according to the present embodiment. The array optical connector according to the present embodiment is configured in such a manner that an optical input/output section 102 for inputting/outputting a light beam into/from an array optical interface module 109 is provided on an optical transmission path 101, an end surface of which is cut obliquely at 45 degrees so as to make the side of the lower surface (the surface brought into contact with the optical module) longer than the upper surface side, that metal patterns 107 and 108 are formed on the upper and lower surfaces on the optical transmission path 101, and that there are formed vias 103 for connecting between the metal patterns 107 and 108 on the upper and lower surfaces of the optical transmission path 101.

It is assumed that the optical transmission path 101, the end surface of which is cut obliquely at 45 degrees, is formed by cores 104 and clads 105. However, it is also possible to apply any other known structure (structure suitable for guiding light beams) as the layer structure and internal structure of the optical transmission path 101.

The array optical connector according to the present embodiment functions as an array optical connector for coupling a transmission module in such a manner that parallel optical signals emitted from a VCSEL array in the array optical interface module 109 are made incident on the optical transmission path 101 in the connector, and that the parallel optical signals, the optical path of which is bent at a right angle by a 45-degree mirror 106, are then transmitted in the optical transmission path 101.

In the optical transmission path 101, there are highly precisely formed fitting holes 110 for fitting therein fitting pins provided on the optical interface module. The laser beam machining using a laser, such as a UV-YAG laser and an excimer laser, can be applied to form the fitting holes 110. Note that contrary to the example shown in the figure, it is also possible to configure such that protrusions are provided on the side of the optical transmission path, and that fitting holes are provided on the side of the optical interface module.

The vias 103 are manufactured with sufficient precision in the optical transmission path 101 (by using, for example, the laser beam machining or the like).

Since the optical transmission path 101 is manufactured by a semiconductor process, it is also possible to simultaneously manufacture, by an exposure method, an alignment marker or a pattern for forming the fitting holes, which are formed by the metal pattern 107 on the optical transmission path 101. That is, the alignment marker or the marker for forming the fitting holes can be highly precisely formed as a metal pattern on the optical transmission path 101. As a result, it is possible to highly precisely perform alignment with the array optical interface.

Note that the alignment for optical coupling with the array optical interface module 109 may also be performed by using the vias 103 as the alignment marker formed by the metal pattern or as the fitting holes 110.

Heat paths in the upward direction for heat generated in the module is formed of the metal pattern 107 on the connector lower surface, the vias 103, and the metal pattern 108 on the connector upper surface, so that the heat generated in the module is dissipated in the air from the metal pattern 108. Note that the metal pattern 108 on the upper side may be provided with recessions and projections in order to increase a heat dissipation area. On the other hand, it is preferred that the metal pattern 107 on the lower side is formed in a surface state without recessions and projections, so as to have excellent adhesion property with the upper surface of the module.

The maximum length of the metal patterns 107 and 108 is not limited in particular, as long as the length is longer than a length which enables the heat generated by the optical element and the driver IC in the array optical interface module to be sufficiently dissipated in the air. Note that it is preferred that the metal pattern 107 is positioned immediately above the driver IC (or receiver IC) which is the largest heat generating source in the optical module.

Further, the thickness of the metal patterns 107 and 108 are, in principle, optimally set according to the heat conductivity of a material used for the metal patterns. However, in the case where an electromagnetic shielding conductor cannot be added on the upper surface of the array optical interface module coupled with the array optical connecter, a thickness corresponding to the electromagnetic field penetration depth expressed by the following formula is required as the thickness of the metal pattern.

An electromagnetic field penetration depth in a conductor [Formula 1]

$$\delta = \sqrt{\frac{2}{\omega \sigma \rho}}$$

($\omega$:angular frequency, $\sigma$:conductivity, $\rho$:magnetic permeability)

Note that here, there is described, as an example, a case where the optical transmission path 101 has a line shape, but the optical transmission path 101 may be configured as a film-like waveguide (flexible waveguide). Further, optical fibers may be used as the optical waveguide 101, and a fiber sheet formed by sandwiching the optical fibers by a known laminate material may also be used.

As a material of the optical waveguide 101, it is preferred to use a known material made of a resin which is formed of an Si-based material, an epoxy-based material, or a polyimide-based material.

It may also be configured such that a PD (photo detector) array is used instead of the VCSEL array. In this case, it is obvious that the signal flow is reversed from the signal flow in the case where the VCSEL array is used, and that the array optical connector functions as a connector for a reception module.

According to the present embodiment, it is possible to easily secure the heat path in the upward direction in the optical connector which is inserted and extracted immediately above the heat generating bodies, such as the optical element and the driver IC in the optical interface module. Further, the heat path can be manufactured by etching or punching a high heat conductive material similarly to the optical transmission path configuring the optical connector, and hence it is possible to reduce the cost of the optical connector to a level equal to or less than the cost of the conventional optical connecter.

Further, by providing the metal pattern on the side of the optical waveguide, it is possible to improve the reflectance of light in the optical path bending mechanism.

Further, when the alignment marker is formed by the metal pattern, the marker on the optical waveguide, which marker is manufactured by a semiconductor process, has an enhanced manufacturing accuracy, and hence a highly efficient optical coupling can be effected.

Further, when the thickness of the metal pattern is set to the electromagnetic field penetration depth of the conductor, it is possible to eliminate the electromagnetic shielding pattern or the electromagnetic shielding member on the upper surface of the optical interface module coupled with the optical connector.

[Second Exemplary Embodiment]

There will be described a second exemplary embodiment in which the present invention is preferably implemented.

Figure 6:
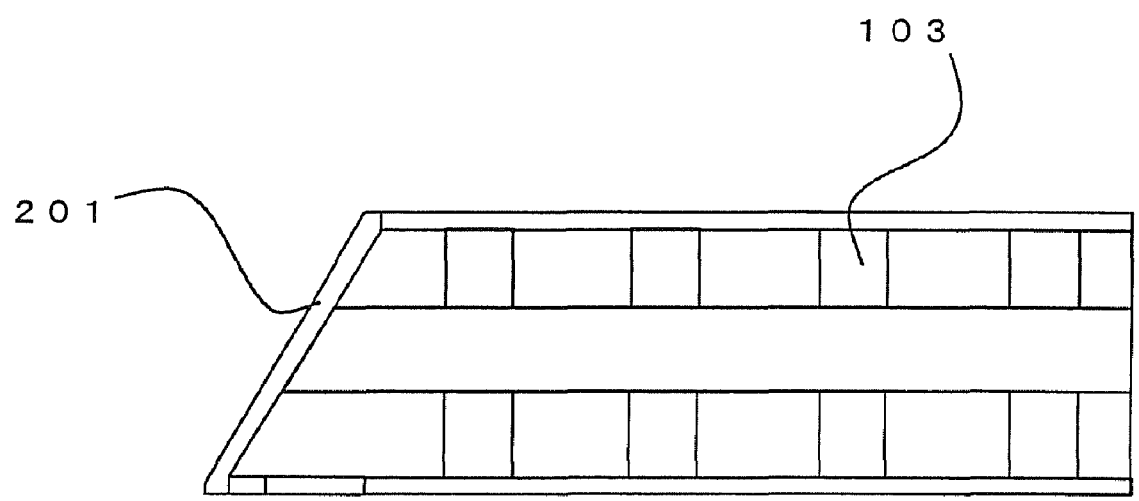
FIG. 6 is a figure showing a configuration of an array optical connector according to a second exemplary embodiment in which the present invention is preferably implemented.

FIG. 6 is a figure showing a configuration of an array optical connector according to the present embodiment. In the present embodiment, a metal pattern 201 is formed on the 45-degree mirror portion of the optical transmission path 101.

By providing the metal pattern 201, it is possible to more easily secure the heat path in the upward direction. That is, when the heat is transferred from downward to upward, it is possible to use not only the vias 103 but also the waveguide side surface as the heat path, and thereby, it is possible to more surely secure the heat path in the upward direction.

On the other hand, the metal pattern 201 has an effect of increasing the optical reflectance.

Since the other configurations and operations are the same as those of the first exemplary embodiment except for providing the metal pattern 201 in the 45-degree mirror section, the duplicated explanation is omitted.

[Third Exemplary Embodiment]

There will be described a third exemplary embodiment in which the present invention is preferably implemented.

Figure 7:
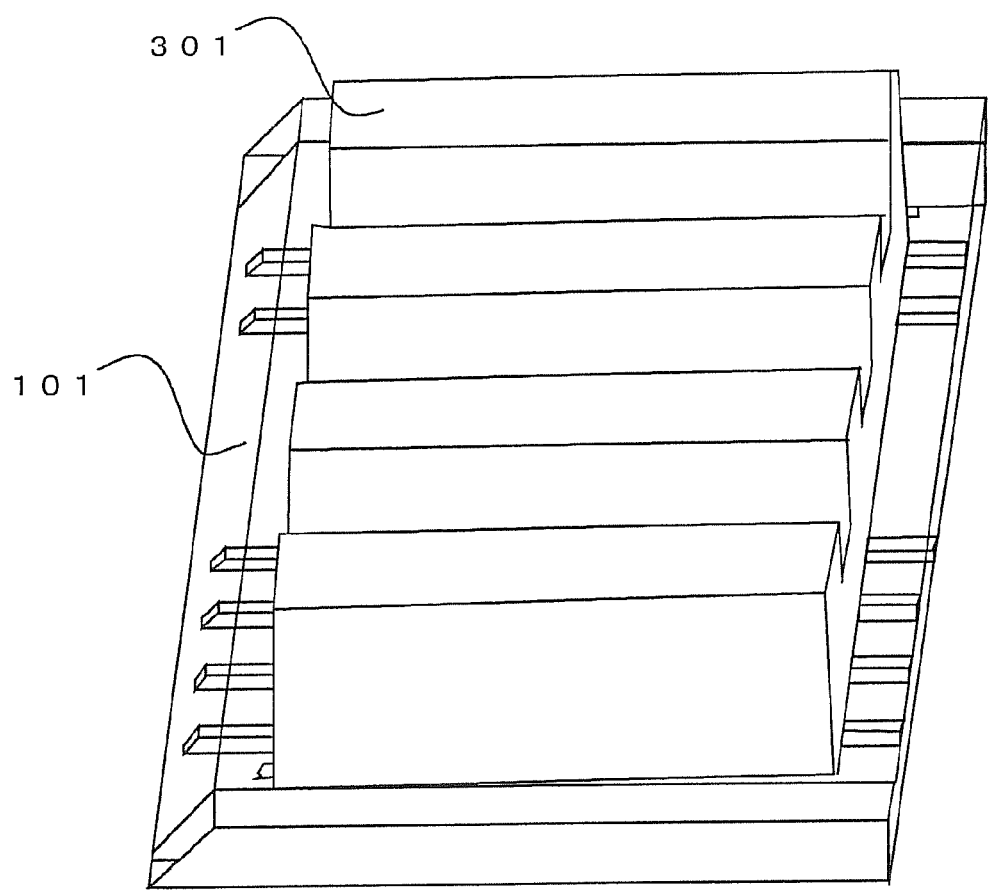
FIG. 7 is a figure showing a configuration of an array optical connector according to a third exemplary embodiment in which the present invention is preferably implemented.

FIG. 7 is a figure showing a configuration of an array optical connector according to the third exemplary embodiment. The array optical connector according to the third exemplary embodiment has almost the same configuration as that of the first exemplary embodiment, but is different in that a heat sink 301 is mounted in the upper portion of the metal pattern 108 on the upper side of the optical transmission path 101.

In the present embodiment, the heat generated by the driver IC in the array optical interface module is transferred to the metal pattern 108 via the metal pattern 107 on the lower surface of the connector and the vias 103, and is then dissipated into the air via the heat sink 301. The heat sink 301 may be directly mounted to the optical waveguide 101, or may be indirectly attached by a module peripheral component.

Thereby, it is possible to reduce the length of the metal pattern 108 which is necessary to allow the heat generated by the optical element and the driver IC in the array optical interface module to be sufficiently dissipated into the air, and hence it is possible to more efficiently dissipate the heat.

Since the other configurations and operations are the same as those of the first exemplary embodiment except for providing the heat sink 301 on the metal pattern 108 on the upper side of the optical transmission path 101, the duplicated explanation is omitted.

[Fourth Exemplary Embodiment]

There will be described a fourth exemplary embodiment in which the present invention is preferably implemented.

Figure 8:
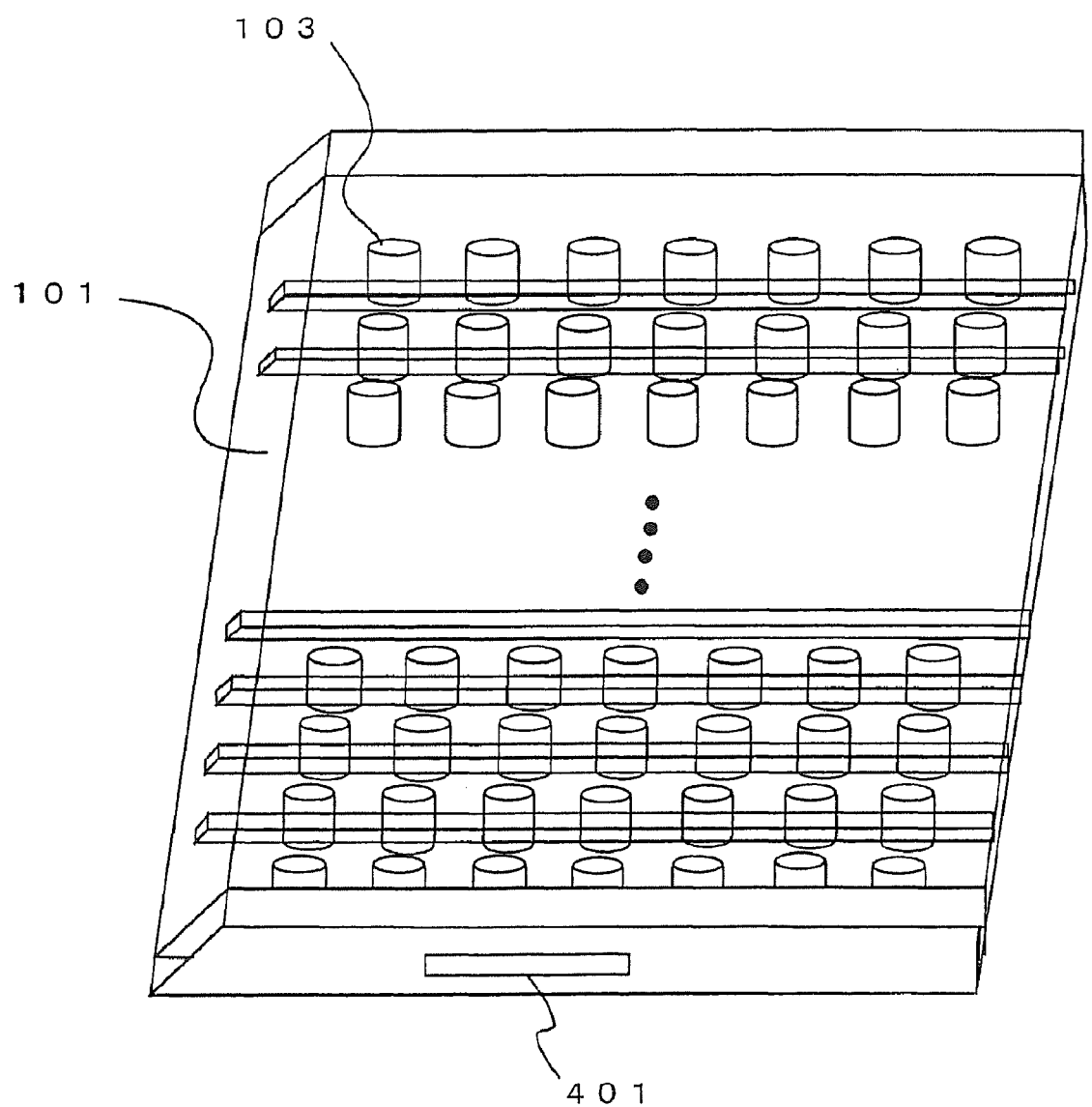
FIG. 8 is a figure showing a configuration of an array optical connector according to a fourth exemplary embodiment in which the present invention is preferably implemented.

FIG. 8 is a figure showing a pressing configuration of an array optical connector according to the present embodiment.

There is formed a groove 401 of a waveguide fixation pressing mechanism on the side of optical waveguide 101. The array optical connector can be fixed and optically coupled with the array optical interface module by using the groove 401.

In the case where the groove 401 is not provided, it is necessary to fix the optical connector by using a tool (not shown in FIG. 3) after the fitting pins on the side of the optical module are fitted into the fitting holes 110. However, the optical connector according to the present embodiment includes the groove 401. Thus, by installing a fixing tool beforehand in the module or the mounting board, it is possible to fix the optical connector at a predetermined position only by fitting the fitting pins into the fitting holes 110.

That is, by installing the optical connector fixing tool on the module or the mounting board, it is possible to fix and optically couple the optical connector with the module by using the groove 401.

Since the other configurations and operations are the same as those of the first exemplary embodiment except for providing the above described array optical connector pressing mechanism, the duplicated explanation is omitted.

[Fifth Exemplary Embodiment]

There will be described a fifth exemplary embodiment in which the present invention is preferably implemented.

Figure 9:
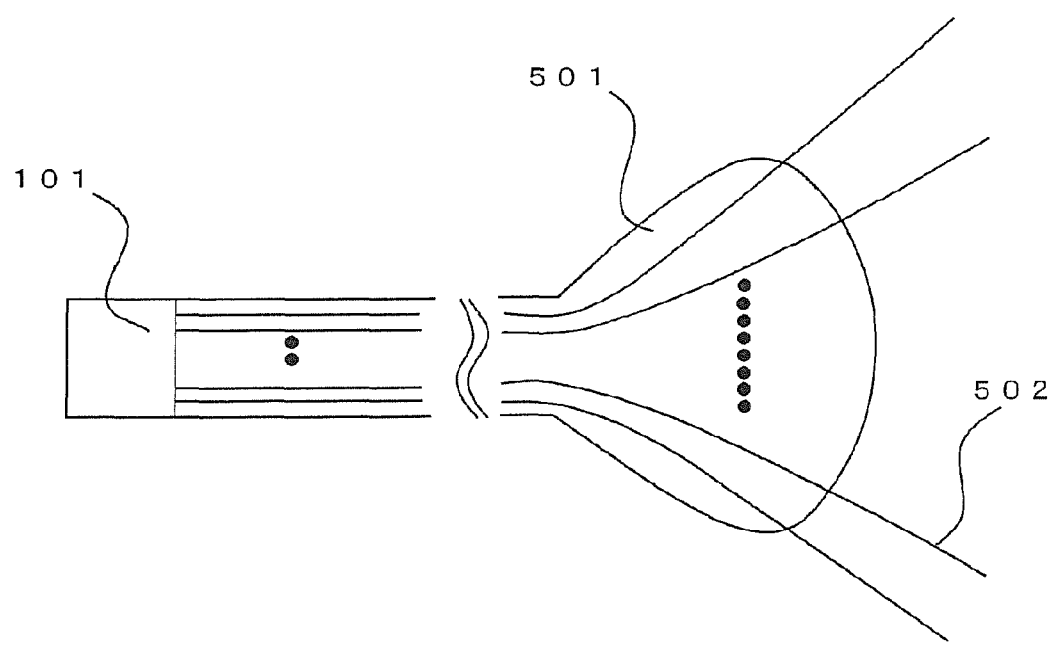
FIG. 9 is a figure showing a configuration of an array optical connector according to a fifth exemplary embodiment in which the present invention is preferably implemented.

FIG. 9 is a figure showing a configuration of an array optical connector according to the present embodiment. The array optical connector according to the present embodiment includes a fan-out section at the end opposite to the optical input/output section which is optically coupled with the array optical interface module.

The array optical connector can be used in the state of a parallel transmission path, or can also be fanned out so as to be used as single transmission paths 502.

A fan-shaped metal pattern 501 is formed in the fan-out section. The purpose of this configuration is to increase the area of the metal pattern as much as possible, to thereby realize the enhanced heat dissipation property.

Since the other configurations and operations are the same as those of the first exemplary embodiment except for providing the array optical connector pressing mechanism, the duplicated explanation is omitted.

Note that the above described embodiments are examples in which the present invention is preferably implemented, and the present invention is not limited to these.

For example, in the above description, there are described configurations in which each of the metal pattern 201, the heat sink 301, the fan-out, and the like, is further added on the basis of the configuration of the array optical connector according to the first exemplary embodiment, but it is possible to configure such that some of the metal pattern 201, the heat sink 301, the fan-out, and the like, are combined and added to the configuration of the array optical connector according to the first exemplary embodiment.

Further, it may also be configured such that a gel or a sheet which has a heat dissipation property is arranged on both sides of the optical transmission path, so as to be physically connected with each other. By using the gel-like member or the sheet-like member as a member having a heat conductivity higher than that of the optical transmission path, it is possible to increase the heat dissipation area and thereby it is possible to easily secure the heat path.

In this way, various modifications are possible within the scope and spirit of the present invention.

This application is based upon and claims the benefit of priority from Japanese patent application No. 2006-225417, filed on Aug. 22, 2006, the disclosure of which is incorporated herein in its entirety by reference.

| | Description of Symbols |
|---|---|
| 101 | Optical transmission path |
| 102 | Optical input/output section |
| 103 | Via |
| 106 | 45-degree mirror |
| 107, 108 | Metal pattern |
| 109 | Array optical interface module |
| 201 | Metal pattern |
| 301 | Heat sink |
| 501 | Fan-shaped metal pattern |
| 502 | Transmission path |
| 601 | Transparent plate |
| 602 | Optical element |
| 603 | Input/output IC |
| 604 | Via substrate |
| 701 | V-groove |
| 702 | Inclined mirror |
| 703 | Optical fiber array |
| 704 | Cover glass |

The invention claimed is:

1. An optical connector comprising:
an optical transmission path including an optical path changing function section at an end section thereof; and
a protrusion and a hole for fitting the optical transmission path and an optical interface module,
wherein in the optical transmission path, a light incident/emitting surface and the surface facing the light incident/emitting surface are sandwiched by high heat conductive members having a heat conductivity higher than the heat conductivity of the optical transmission path, and
wherein the high heat conductive members on both the surfaces of the optical transmission path are physically connected to each other by a via having a heat conductivity higher than the heat conductivity of the optical transmission path, and
wherein the via is the hole, and fits on the protrusion.

2. The optical connector according to claim 1, wherein the hole for fitting the optical transmission path is formed on an array optical interface module.

3. The optical connector according to claim 1, wherein the high heat conductive members are in a gel state or in a sheet state.

4. The optical connector according to claim 1, wherein the high heat conductive members are made of a metal.

5. The optical connector according to claim 1, wherein the via is filled with a material having a heat conductivity higher than the heat conductivity of the optical transmission path.

6. The optical connector according to claim 1, wherein an alignment marker for fitting an optical interface module is formed on the optical transmission path.

7. An optical coupling structure, wherein the light incident/emitting surface of the optical connector according to claim 1 is arranged to face a light emitting/incident surface of an optical interface module.

* * * * *